United States Patent
Rentsch-Smith et al.

(10) Patent No.: US 9,971,053 B2
(45) Date of Patent: May 15, 2018

(54) USING CROSSLINE MEASUREMENT DATA FOR AN ACTION RELATING TO SURVEY OF A TARGET STRUCTURE

(71) Applicant: WESTERNGECO L.L.C., Houston, TX (US)

(72) Inventors: Susanne Rentsch-Smith, Hove (GB); Philippe Caprioli, Cobham (GB); Massimiliano Vassallo, Brighton (GB); Dirk-Jan Van Manen, Redhill (GB)

(73) Assignee: WesternGeco L.L.C., Houston, TX (US)

( * ) Notice: Subject to any disclaimer, the term of this patent is extended or adjusted under 35 U.S.C. 154(b) by 1023 days.

(21) Appl. No.: 13/855,610

(22) Filed: Apr. 2, 2013

(65) Prior Publication Data
US 2013/0261980 A1    Oct. 3, 2013

Related U.S. Application Data (60) Provisional application No. 61/619,884, filed on Apr. 3, 2012.

(51) Int. Cl.
  *G01V 1/36* (2006.01)
  *G01V 1/38* (2006.01)
  *G01V 1/30* (2006.01)

(52) U.S. Cl.
CPC ............ *G01V 1/3808* (2013.01); *G01V 1/307* (2013.01); *G01V 1/36* (2013.01); *G01V 1/3817* (2013.01); *G01V 2200/14* (2013.01); *G01V 2210/72* (2013.01)

(58) Field of Classification Search
CPC .............................. G01V 1/38–1/393
USPC .......................................... 702/14
See application file for complete search history.

(56) References Cited

U.S. PATENT DOCUMENTS

| | | | | |
|---|---|---|---|---|
| 5,838,564 A | * | 11/1998 | Bahorich | G01V 1/301 702/16 |
| 6,205,403 B1 | | 3/2001 | Gaiser et al. | |
| 7,791,980 B2 | | 9/2010 | Robertsson et al. | |
| 7,961,551 B2 | | 6/2011 | Robertsson et al. | |
| 2008/0019215 A1 | | 1/2008 | Robertsson et al. | |
| 2008/0175097 A1 | * | 7/2008 | Storteig | B63B 21/66 367/16 |
| 2008/0189043 A1 | * | 8/2008 | Anno | G01V 1/308 702/14 |
| 2009/0003132 A1 | | 1/2009 | Vassallo et al. | |

(Continued)

FOREIGN PATENT DOCUMENTS

| | | |
|---|---|---|
| GB | 2414804 A | 12/2005 |
| WO | 2008134177 | 11/2008 |

OTHER PUBLICATIONS

International Search Report and Written Opinion of PCT Application No. PCT/US2013/035165 dated Jul. 18, 2013: pp. 1-13.

(Continued)

*Primary Examiner* — Michael Dalbo
(74) *Attorney, Agent, or Firm* — Michael Guthrie (57) ABSTRACT

Methods and systems for survey operations are provided. In some embodiments, crossline measurement data measured by at least one survey receiver is received. Based at least in part on a characteristic of the crossline measurement data, an option from among a plurality of candidate options is selected, where the selected option is for use in an action relating to survey of a target structure.

14 Claims, 6 Drawing Sheets

(56) References Cited

U.S. PATENT DOCUMENTS

| | | | |
|---|---|---|---|
| 2009/0067285 A1 | 3/2009 | Robertsson et al. | |
| 2009/0238036 A1 | 9/2009 | Robertsson et al. | |
| 2009/0290448 A1 | 11/2009 | Vassallo et al. | |
| 2010/0014381 A1 | 1/2010 | Beasley et al. | |
| 2010/0124148 A1* | 5/2010 | Kluver | G01V 1/36 367/24 |
| 2010/0271904 A1* | 10/2010 | Moore | G01V 1/3808 367/73 |
| 2010/0274492 A1 | 10/2010 | Rentsch et al. | |
| 2011/0038227 A1* | 2/2011 | Kostov | G01V 1/364 367/21 |

OTHER PUBLICATIONS

Allen, "Automatic Earthquake Recognition and Timing From Single Traces," Bulletin of the Seismological Society of America, Oct. 1978, vol. 68(5): pp. 1521-1532.

Amundsen, "Wavenumber-based filtering of marine point-source data," Geophysics, Sep. 1993, vol. 58(9): pp. 1335-1348.

Baer et al., "An Automatic Phase Picker for Local and Teleseismic Events," Bulletin of the Seismological Society of America, Aug. 1987, vol. 77(4): pp. 1437-1445.

Earle et al., "Characterization of Global Seismograms Using an Automatic-Picking Algorithm," Bulletin of the Seismological Society of America, Apr. 1994, vol. 84(2): pp. 366-376.

Supplementary European Search Report issued in related EP Application No. 13772934.9 dated Feb. 1, 2016 (3 pages).

Communication issued in related EP Application No. 13772934.9 dated Feb. 19, 2016 (8 pages).

Communication pursuant to Article 94(3) for the equivalent European patent application 13772934.9 dated Feb. 15, 2018.

* cited by examiner

FIG. 8 ent data regarding a subsurface structure. A survey operation can be performed by a survey data acquisition system, which can include one or multiple survey sources and survey receivers. The survey source(s) can produce signals that are propagated into the subsurface structure. The seismic receivers are able to detect signals reflected from or affected by the subsurface structure.
USING CROSSLINE MEASUREMENT DATA FOR AN ACTION RELATING TO SURVEY OF A TARGET STRUCTURE

CROSS-REFERENCE TO RELATED APPLICATION

This application claims the benefit under 35 U.S.C. § 119(e) of U.S. Provisional Patent Application Ser. No. 61/619,884 filed Apr. 3, 2012, which is incorporated herein by reference in its entirety.

BACKGROUND

Survey operations can be performed to acquire measurement data regarding a subsurface structure. A survey operation can be performed by a survey data acquisition system, which can include one or multiple survey sources and survey receivers. The survey source(s) can produce signals that are propagated into the subsurface structure. The seismic receivers are able to detect signals reflected from or affected by the subsurface structure.

The survey data collected by the survey receivers can be processed to characterize the subsurface structure. Based on the characterization, it can be determined whether or not the subsurface structure contains elements of interest.

SUMMARY

In general, according to some implementations, a method includes receiving crossline measurement data measured by at least one survey receiver, and based at least in part on a characteristic of the crossline measurement data, selecting an option from among a plurality of candidate options, the selected option for use in an action relating to survey of a target structure.

In general, according to some implementations, a computer system comprises means for receiving crossline measurement data measured by at least one survey receiver, and means for selecting an option from among a plurality of candidate options based at least in part on a characteristic of the crossline measurement data, the selected option for use in an action relating to survey of a target structure.

In general, according to some implementations, an information processing apparatus for use in a computer system comprises means for receiving crossline measurement data measured by at least one survey receiver, and means for selecting an option from among a plurality of candidate options based at least in part on a characteristic of the crossline measurement data, the selected option for use in an action relating to survey of a target structure.

In general, according to some implementations, a computer system includes at least one processor to receive acquired data that corresponds at least in part to a target structure, identify a quantity of crossline energy in the acquired data, and identify a location of the quantity of crossline energy in the acquired data.

In general, according to some implementations, an article comprising at least one machine-readable storage medium stores instructions that upon execution cause a computer system to receive crossline measurement data measured by at least one survey receiver, and based at least in part on a characteristic of the crossline measurement data, selecting an option from among a plurality of candidate options, the selected option for use in an action relating to survey of a target structure.

In general, according to further or other implementations, the action includes processing survey data collected by survey equipment.

In general, according to further or other implementations, selecting the option from among the plurality of candidate options comprises selecting from among a plurality of different types of data processing techniques.

In general, according to further or other implementations, selecting from among the plurality of different types of data processing techniques comprises selecting from among at least a 2-dimensional data processing technique, a 2.5-dimensional data processing technique, and a 3-dimensional data processing technique.

In general, according to further or other implementations, the characteristic of the crossline measurement data includes an amount of crossline energy, and wherein selecting the option comprises selecting a first data processing technique in response to a first amount of the crossline energy, and selecting a second, different data processing technique in response to a second, different amount of the crossline energy.

In general, according to further or other implementations, the action includes adjusting at least one parameter associated with performing the survey of the target structure.

In general, according to further or other implementations, the at least one parameter includes a spacing between survey lines including survey receivers.

In general, according to further or other implementations, adjusting the at least one parameter includes performing a real-time adjustment of the at least one parameter during performance of the survey of the target structure.

In general, according to further or other implementations, selecting the option from among the plurality of candidate options is based at least in part on comparing the characteristic of the crossline measurement data to a predicted characteristic of the crossline measurement data.

In general, according to further or other implementations, receiving the crossline measurement data comprises the crossline measurement data measured by the at least one survey receiver in a towed marine streamer.

In general, according to further or other implementations, the identifying of the quantity of crossline energy is performed using pre-stack data.

In general, according to further or other implementations, the identifying of the quantity of crossline energy is performed using post-stack data.

In general, according to further or other implementations, the characteristic includes an amount of crossline energy.

In general, according to further or other implementations, the crossline energy is determined based on one or more selected from the group consisting of: analysis of amplitudes of measurement data; analysis of root-mean-square amplitudes of measurement data; analysis of at least one power spectrum of measurement data; analysis of at least one spectrogram of measurement data; analysis of short time average and long time average values of measurement data; cross-correlation between inline and crossline measurement data; analysis of a ratio between amplitudes of inline and crossline measurement data; analysis of a ratio between spectra or spectrograms of inline and crossline measurement data; polarization analysis; and time gradient ratio analysis.

In general, according to further or other implementations, the action includes processing survey data collected by survey equipment.

In general, according to further or other implementations, selecting the option from among the plurality of candidate options comprises selecting from among a plurality of different types of data processing techniques.

Other or alternative features will become apparent from the following description, from the drawings, and from the claims.

BRIEF DESCRIPTION OF THE DRAWINGS

Some embodiments are described with respect to the following figures:

FIGS. 4A-4D are graphs illustrating amplitudes of measurement data useable for determining crossline energy according to some implementations;

DETAILED DESCRIPTION

A survey system for acquiring data regarding a subsurface structure can include seismic survey equipment, electromagnetic (EM) survey equipment (for performing controlled source EM surveying or magnetotelluric surveying, for example), or another type of survey equipment that employs survey receivers to measure data associated with the subsurface structure. A survey system can be a marine survey system, where survey equipment (including one or more survey sources and survey receivers) can be towed through a body of water. Alternatively, the marine survey system can employ ocean bottom survey receivers, where survey receivers can be provided on ocean bottom cables that are placed on the seafloor. In other examples, a survey system can be a land-based survey system, where survey source(s) and survey receivers are deployed on land. As yet further examples, a survey data acquisition system can be used for transition zone exploration, where a transition zone refers to a coastal area that connects a body of water with land.

A survey system can be an active source survey system or a passive survey system. An active source survey system employs a survey source (or multiple survey sources) that can be controlled by an operator to emit signals into the subsurface structure. In response to the emitted signals, survey receivers can measure signals that are reflected or affected by the subsurface structure. In a passive survey system, an active survey source(s) controlled by an operator is not used.

In the ensuing discussion, although reference is made to surveys of a subsurface structure, it is noted that techniques or mechanisms according to some implementations can be applied to other types of target structures, including human tissue, a mechanical structure, a structure relating to mining, and so forth.

When performing processing of measurement data collected by survey receivers or when performing a survey data acquisition operation, various different options are available from which a selection can be made. For example, different options relating to data processing include two-dimensional (2D) data processing, 2.5D data processing, or three-dimensional (3D) data processing (which are discussed further below). Different options relating to performing a survey data acquisition operation can include different values of at least one parameter that relates to performing the survey data acquisition operation.

It can be difficult for an operator to select from among the different options to use when performing an action (e.g. data processing or survey data acquisition operation) relating to a survey of a subsurface structure. In accordance with some implementations, the decision can be made based at least in part on a characteristic associated with measured crossline data (discussed further below).

Figure 1:
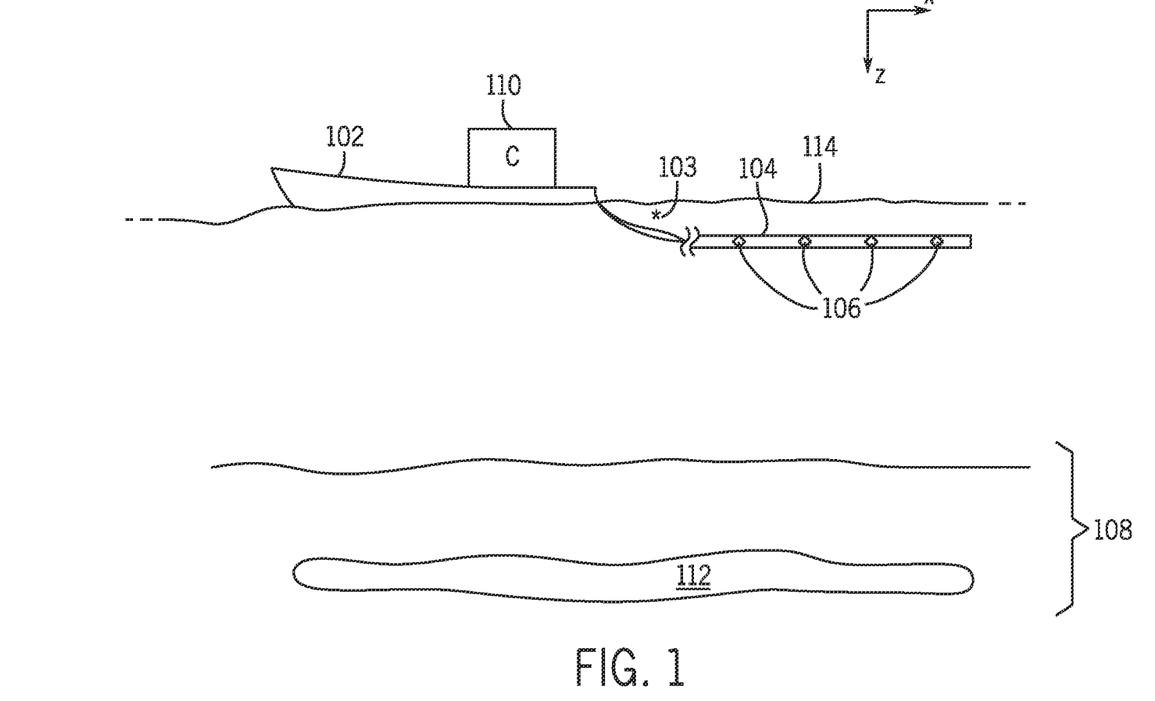
FIGS. 1 and 2 are schematic diagrams of example survey arrangements that incorporate some implementations.

FIG. 1 illustrates an example of a marine survey arrangement that includes a marine vessel 102 for towing a streamer 104 through a body of water. The streamer 104 includes survey receivers 106. A survey source (or multiple survey sources) 103 can also be towed by the marine vessel 102 or by a different marine vessel. Survey signals produced by the survey source(s) can be propagated into a subsurface structure 108. In some examples, it is assumed that these signals propagate in a vertical plane containing the x and z axes in FIG. 1. Signals reflected from or affected by the subsurface structure 108 can be detected by the survey receivers 106.

Measurement data acquired by the survey receivers 106 can be communicated to a computer system 110, which can be provided on the marine vessel 102 or at another location (such as a land-based facility). The computer system 110 can apply data processing on the measurement data to characterize the subsurface structure 108. For example, processing of the measurement data can be used to determine whether the subsurface structure 108 includes a target element of interest 112, which can be a hydrocarbon reservoir, a fresh water aquifer, or other element of interest.

Although FIG. 1 depicts one streamer 104 being towed by the marine vessel 102, it is noted that in alternative implementations, multiple streamers 104 can be towed by the marine vessel 102.

If two-dimensional (2D) marine survey exploration is used, then the marine vessel 102 may tow just one streamer 104. In some cases, a 2D marine survey exploration can employ multiple streamers 104 provided at different depths below a sea surface 114 (such as in an over-under arrangement). In 2D marine survey exploration, the measurement data of interest lies in a plane that includes an inline direction (in the x axis shown in FIG. 1) and a vertical direction (in the z axis shown in FIG. 1). In the orientation of FIG. 1, this plane can be the vertical plane. The inline direction can be a direction of the survey receivers 106 along the streamer 104, for example.

Figure 2:
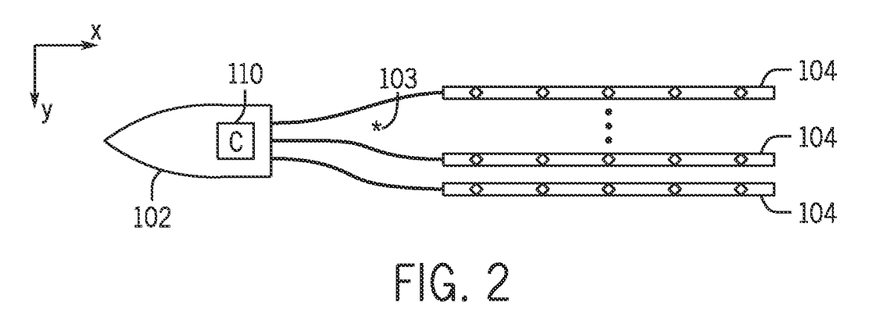

In other examples, 3-dimensional (3D) survey exploration can be performed, where the marine vessel 102 can tow multiple streamers 104 side by side. For example, FIG. 2 shows an example where the marine vessel 102 is towing multiple streamers 104 side by side (along a y axis as shown in FIG. 2). A direction along the y axis is considered to be a crossline direction, which is generally perpendicular to the inline direction. The inline and crossline directions lie within a horizontal plane that includes the x and y axes shown in FIG. 2.

The spacing between successive pairs of the streamers 104 shown in FIG. 2 can be a regular spacing or an irregular spacing. In some cases, the streamers 104 can be parallel to each other. Alternatively, the streamers 104 can be feathered, where one or more of the streamers 104 can have a lateral deviation from the towing (inline) direction due to water current or other causes. In some examples, the streamers 104 can be slanted streamers. Also, the streamers 104 can be at different depths, and each streamer 104 may be provided at varying depths during the survey operation. In further examples, the streamers 104 can be used in a coil survey acquisition operation, where the streamers 104 can be towed through a series of overlapping, continuously linked circles.

Although FIGS. 1 and 2 depict marine survey arrangements that include one or more streamers, it is noted that techniques or mechanisms according to some implementations can be applied to other types of survey arrangements, including ocean bottom survey arrangements, land-based survey arrangements, transition zone survey arrangements and so forth.

The survey receivers 106 can include multi-component survey receivers. A multi-component survey receiver can measure signals in multiple directions, such as in the x and y directions, or in the x, y, and z directions, or in any other combination of directions. Using measurement data acquired by multi-component survey receivers, it becomes possible to obtain an indicator of a signal's propagation direction. For example, in the seismic data acquisition context, a seismic receiver can include a sensor that can measure spatial pressure gradients or particle motion (e.g. accelerometer or geophone) in multiple directions. More generally, such a sensor is considered to measure signal motion. A seismic receiver can also include a sensor that is sensitive to pressure changes (e.g. a hydrophone). It is noted that spatial pressure gradients, particle acceleration, particle velocity and particle motion are considered equivalent measurements as they can be obtained from each other. In further examples, a hydrophone can be used to determine signals in different directions.

Examples of data processing that can be performed by the computer system 110 (either on the marine vessel 102 or at a remote location such as a land-based facility) can include one or some combination of the following: noise attenuation processing to attenuate noise in measured survey data; spectral broadening to broaden the content of measurement data in a frequency spectrum, such as due to decomposition of wavefields into up-going and down-going wavefields; multiple removal (to remove multiples caused by reflections from a sea surface); model building (to build a model that represents a subsurface structure); imaging (to produce an image of the subsurface structure); and others.

The types of data processing that can be applied on data measured by survey receivers can include 2D data processing, 2.5D data processing, or 3D data processing. 2D (or inline) data processing refers to processing of measurement data in the inline direction (along the x direction shown in FIGS. 1 and 2) and in the vertical direction (along the z axis in FIG. 1). 2D data processing involves a smaller amount of data and is thus usually less computationally intensive. 2D processing assumes that wavefield propagation is confined to the vertical plane containing the source and the receivers. In this case, recording along the streamer in the inline or x direction is enough to fully describe and process the wavefield. Data can be processed on a streamer by streamer basis. Consequently, if the data contains out-of-vertical-plane events, 2D processing may not treat such out-of-vertical-plane data accurately. A y component measurement may not be involved in 2D processing, but the y component measurement may be useful in assessing the results of the 2D processing.

2.5D data processing refers to processing of measurement data that also considers the crossline direction, which is in they axis depicted in FIG. 2. 2.5D data processing does not have to rely on presence of measurement data along the y axis, such as due to provision of multiple streamers 104 spaced apart along they axis as shown in FIG. 2. 2.5D data processing can be based on data that is acquired using 2D survey exploration, but an assumption of a flat earth can be used to define a relationship between x and y measurement data. In other examples, 2.5D processing can also be performed on measurement data acquired with multiple streamers spaced apart along they axis.

3D data processing processes measurement data collected in the x, y, and z directions. Since 3D data processing considers a larger amount of data than 2D or 2.5D data processing, 3D data processing can produce a higher quality characterization of the subsurface structure 108. 3D processing makes no assumption about the direction of propagation of the recorded wavefield. 3D processing may involve different types of measurement data, including pressure data, and data along the x, y and z axes, or a subset of the foregoing data. Under certain assumptions, 3D processing can be approximated using modified 2D processing techniques, such as 2.5D processing. An example assumption is that the geology of the subsurface structure 108 is simple enough so that a flat earth model can be considered. In such a case, the propagation of the wavefield is radial and controlled by the source to receiver distance, which provides the relation between the inline/crossline or x/y axes.

Difficulties can arise in deciding between which of the different types of data processing techniques (e.g. 2D data processing, 2.5D data processing, and 3D data processing) to employ for a particular case. Selecting 2D or 2.5D data processing may allow for faster and less computationally intensive data processing, but may produce a lower quality output under certain conditions. On the other hand, selecting 3D data processing may produce a higher quality output, but the 3D data processing comes at the expense of more computation time and greater load on computer resources.

In accordance with some implementations, techniques or mechanisms are provided to allow for the selection of one of different types of data processing techniques (e.g. 2D processing, 2.5D processing and 3D processing) to use based on crossline measurement data. Crossline measurement data refers to data acquired by at least one survey receiver generally along a crossline direction (e.g. in the y axis depicted in FIG. 2). An amount of the measured crossline energy in the crossline measurement data can be used for determining which of the different types of data processing techniques to employ for a particular case. For example, if the measured crossline energy is a lower amount, then 2D or 2.5D data processing can be applied. On the other hand, if the measured crossline energy is a higher amount, then 3D data processing can be selected.

Crossline energy refers to an amount of energy that is present in a signal that propagates in a crossline direction. The crossline energy can be represented by an amplitude of a crossline signal, for example. In other examples, the crossline energy can be represented by other attribute(s) of the crossline signal, or a quantity derived from the attribute(s) of the crossline signal, where an attribute can refer to a signal amplitude, a signal waveform pattern, and so forth.

In some examples, the amount of measured crossline energy can be compared to an expected amount of crossline energy, which can be predicted using a model based on positions of survey source(s) and survey receiver(s). For example, an expected amount of crossline energy consistent with a horizontally layered model that fits 2D or 2.5D assumptions can be predicted using the position information of survey source(s) and survey receiver(s).

If the amount of measured crossline energy is lower than the expected amount of crossline energy (and in some examples the measured crossline energy is of a negligible amount), then the error present in an output produced using 2D data processing can be relatively small. If the amount of crossline energy is in a range of an expected amount of crossline energy, then 2.5D data processing can be applied to produce a result that is superior to 2D processing. If the amount of crossline energy is higher than the expected amount of crossline energy, then 3D data processing would produce a more accurate result.

In other examples, the amount of crossline energy can be used for performing other decisions, such as decisions regarding acquisition parameters relating to performing acquisition of survey data using a survey system. For example, one acquisition parameter that can be adjusted based on the detected amount of crossline energy can be the lateral spacing (in the y direction) between the streamers 104 of FIG. 2. Other acquisition parameters that can be adjusted include the speed of the marine vessel 102, a path of the marine vessel 102, and so forth.

In other examples, the selection from among different types of data processing techniques or different acquisition parameter values can be based on a different characteristic of the crossline measurement data. For example, the different characteristic can include a location where a given quantity of crossline energy is detected. The location can be a location corresponding to a given survey receiver (or multiple survey receivers), for example.

Techniques or mechanisms according to some implementations allow for quality control (QC) in the processing or acquisition of survey data. Quality control can involve deciding which of the different types of processing (e.g., 2D, 2.5D or 3D) would produce an output of sufficient quality in an efficient manner. Quality control can also involve adjusting an acquisition parameter during a survey data acquisition operation to acquire data in a manner to produce superior results.

Figure 3:
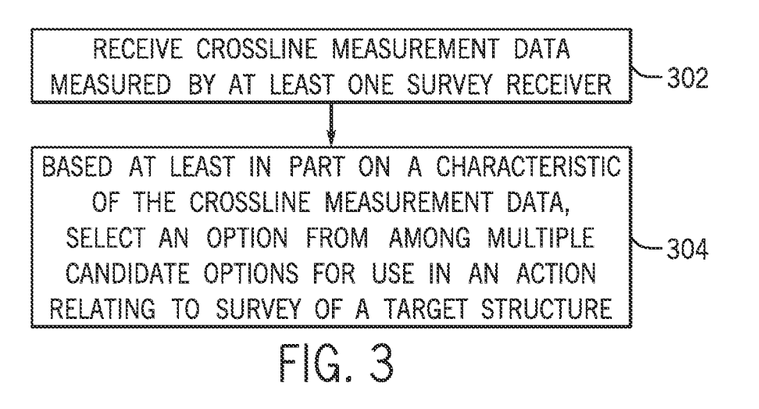
FIG. 3 is a flow diagram of a process according to some implementations.
Figure 4A:
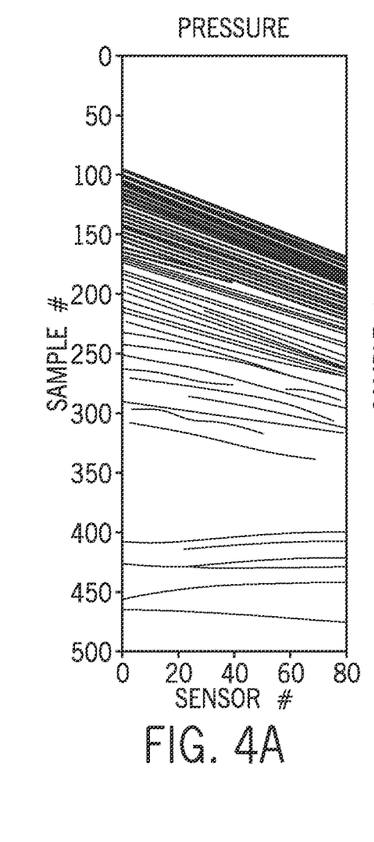
Figure 4B:
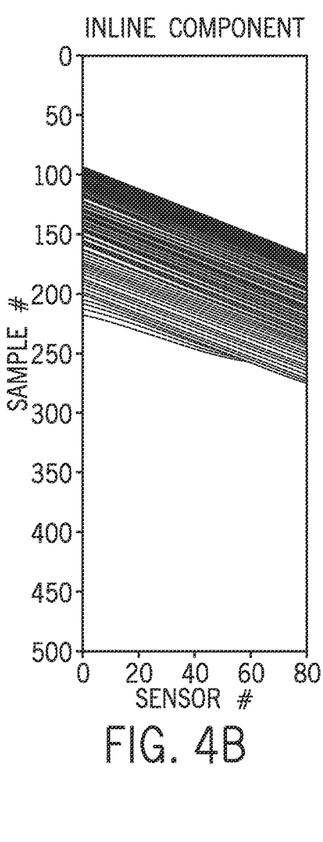
Figure 4C:
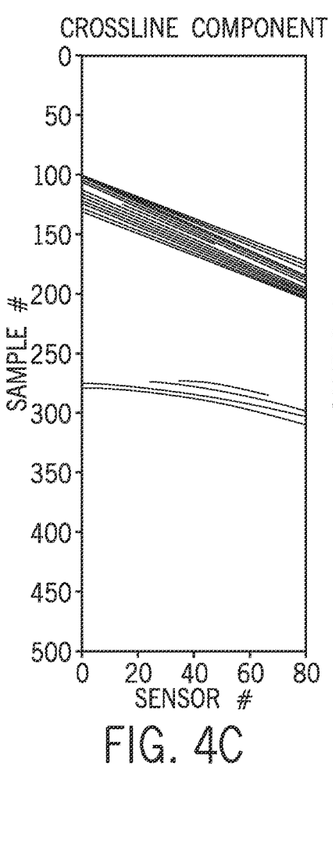
Figure 4D:
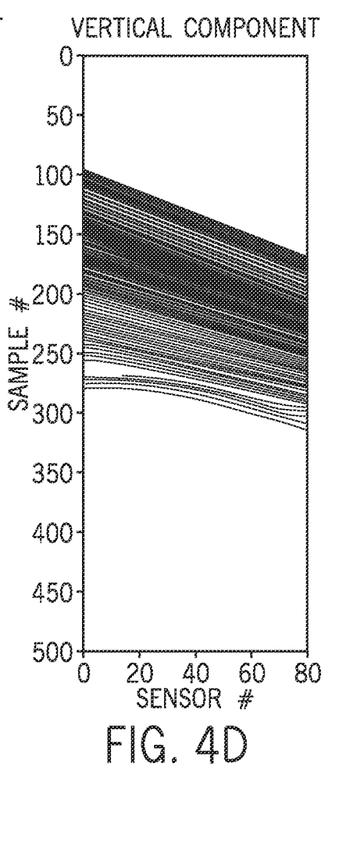

FIG. 3 is a flow diagram of a process according to some implementations. The process can be performed by the computer system 110 of FIG. 1 or 2, for example, or by a different system. Crossline measurement data measured by at least one survey receiver is received (at 302). Based at least in part on a characteristic of the crossline measurement data, an option from among multiple candidate options is selected (at 304) for use in an action relating to survey of a subsurface structure.

The characteristic of the crossline measurement data can include an amount of crossline energy in the crossline measurement data. As another example, a characteristic of the crossline measurement data can be a location of the detected amount of crossline energy within a shot record.

The candidate options can include different types of data processing techniques, such as the 2D, 2.5D, and 3D data processing techniques discussed above. The different candidate options can also include different values of at least one acquisition parameter, such as a lateral spacing between lines (e.g. streamers, cables, etc.) of survey receivers.

The selected option is for use in an action relating to survey of the subsurface structure, where the action can include: (1) data processing of measurement data acquired in the survey, (2) adjusting or setting at least one acquisition parameter for the survey, or (3) any other type of action relating to the survey of the subsurface structure.

Crossline energy can be caused by various different factors. Crossline energy is present in out-of-plane signals, where an out-of-plane signal refers to a signal that propagates in a direction different from a plane (e.g. vertical plane) that includes the x and z axes depicted in FIG. 1. The out-of-plane signal includes a crossline component. In some examples, out-of-plane signal propagation can be caused by the geology of a complex subsurface structure. In other examples, out-of-plane signal propagation can be caused by interference from other acquisition equipment, noise of passing marine vessels or vehicles, rig noise, drilling noise, diffracted installation noise, earthquakes, noise produced by marine creatures, water current noise, noise produced by weather events (e.g. thunder), and so forth.

Crossline energy can be derived based on measurement data collected by multi-component survey receivers. There are several ways to use multi-component measurement data to assess the amount of crossline energy (which is due to a signal propagating out of the plane that includes the x and z axes in FIG. 1). The determination of the amount of crossline energy can be performed in any data domain, such as in a pre-stack domain or a post-stack domain. Pre-stack data refers to data prior to stacking Examples of pre-stack data include a shot gather, a common shot gather, a common offset gather, a common receiver gather, a common midpoint gather, and so forth. Post-stack data refers to data after stacking has been performed. Stacking refers to gathering multiple survey traces (data acquired by survey receivers) and aggregating (e.g. summing) the survey traces.

Crossline energy can be assessed based on one or more of any of the following:

1. Analysis of amplitudes of the multi-component measurement data.
2. Analysis of root mean square (RMS) amplitudes of the crossline (y) component of the multi-component measurement data, where the crossline component can be static (one value for the whole trace or gather) or can vary over time and/or space.
3. Analysis of a power spectrum (or spectra) of the crossline (y) component of the multi-component measurement data, where the crossline component can be static (one value for the whole trace or gather) or dynamic (e.g. calculated in moving time windows and normalized by the power spectrum or spectra of the background noise).
4. Analysis of spectrograms of the crossline (y) component (in a time and space variant manner), possibly normalized to a spectrogram of the background noise.
5. Analysis of short time average/long time average (STA/LTA) values (time and/or space variant) of the multi-component measurement data.
6. Cross-correlation between inline and crossline (x and y) components of the multi-component measurement data, where the inline and crossline components can be static or dynamic.
7. Analysis of a ratio between amplitudes of inline and crossline (x and y) components of the multi-component measurement data.
8. Analysis of a ratio between the spectra or spectrograms of inline and crossline (x and y) components of the multi-component measurement data.
9. Polarization analysis.
10. Time Gradient Ratio analysis of pressure (P) data and the inline or crossline (x or y) component of the multi-component measurement data.

In other examples, the determination of crossline energy can use other techniques.

An example of using amplitudes of multi-component measurement data (which can include pressure, inline (x) motion data, crossline (y) motion data, and vertical (z)

motion data) to determine crossline energy is described in connection with FIGS. 4A-4D.

FIGS. 4A-4D show four graphs 402, 404, 406, and 408, respectively, that depict pressure data, inline (x) motion data, crossline (y) motion data, and vertical (z) motion data. Each of the graphs 402, 404, 406 and 408 represents a shot gather. The horizontal axis of each of the graphs 402, 404, 406 and 408 represents the survey receiver numbers (to identify respective survey receivers). The vertical axis of each of the graphs 402, 404, 406 and 408 represents sample numbers (to identify respective samples of measurement data). The patterns in each of the graphs represent amplitudes of the respective pressure, inline data component, crossline data component and vertical data component. Using the graphs 402, 404, 406 and 408, a quantity of crossline energy that deviates from an expected amount can be detected. Using the graphs 402, 404, 406, and 408, the location (based on the survey receiver number) of the quantity of the crossline energy can also be determined.

If the measurement data were free of out-of-plane wavefields, the crossline component would mainly include just noise. Consequently, any coherent wavefield that is detectable (either visually by a user or by a computer process) on the crossline direction indicates an out-of-plane event.

Similarly, RMS amplitudes (item 2 above), ratios between inline and crossline data components (item 7 above), or other values can be displayed in a shot gather for visual detection of crossline energy. Alternatively, the foregoing values can be processed by a computer system for detection of the amount of crossline energy.

Another example involves using the STA/LTA analysis technique listed in item 5 above. The STA (short time average) data measures the average amplitude in a short time window and is relatively sensitive to sudden increases in the amplitude of a time series of data. In contrast, the LTA (long time average) measures the average amplitude in a longer time window, and hence reflects the amplitude of background noise. The ratio between the STA data and the LTA data provides a measure of the signal-to-noise level in the STA time window. The ratio of STA to LTA data can similarly be plotted in graphs similar to those depicted in FIGS. 4A-4D, for visual detection of unexpected crossline energy. Alternatively, the STA/LTA ratio values can be processed by a computer system for automated detection of crossline energy.

The various techniques listed above for determining crossline energy can be applied in either a pre-stack or post-stack domain. A potential benefit of processing in the pre-stack domain is that quality control decision-making can be performed more quickly, to allow decision-making to occur as each shot is processed so that the decisions can be made on the fly. This can allow for flexible on-board processing, such as processing by the computer system 110 on board the marine vessel 102 of FIG. 1 or 2.

Post-stack processing, on the other hand, may provide a higher signal-to-noise ratio, which can allow for relatively weak crossline events to be detected after the post-stack processing.

Figure 5:
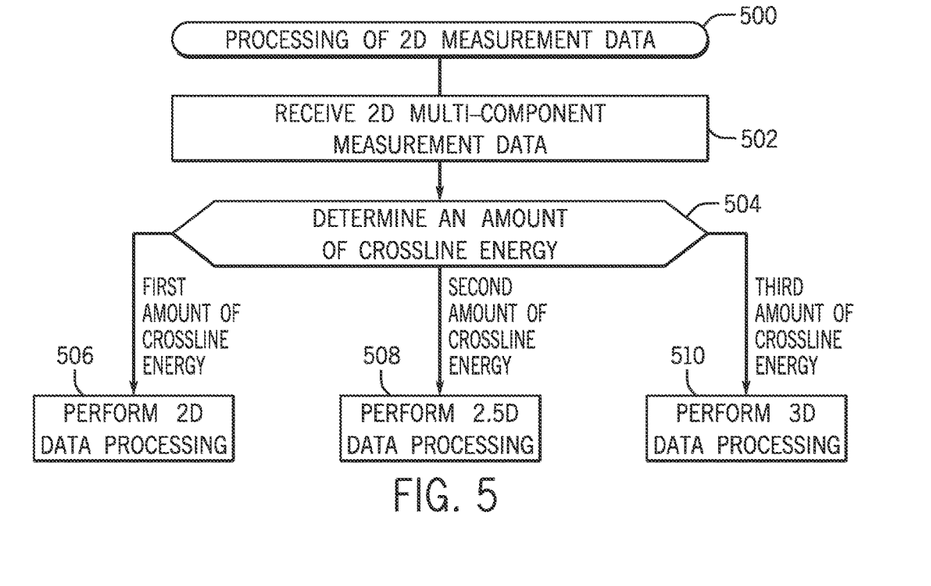
FIGS. 5 and 6 are flow diagrams of processing of measurement data according to various implementations.

FIG. 5 is a flow diagram of a process 500 of processing 2D measurement data according to some embodiments. The process 500 (at 502) 2D multi-component measurement data. The amount of crossline energy is determined (at 504) such as by using any of the techniques discussed above. Based on the determined amount of crossline energy, one of multiple different types of processing techniques is selected.

If the amount of crossline energy is a first amount lower than an expected amount of crossline energy (which can be predicted based on use of a model and positions of one or more survey sources and one or more survey receivers), then the process 500 performs (at 506) 2D data processing. If the amount of crossline energy is a second amount in a range of an expected amount of crossline energy, then 2.5D data processing can be performed (at 508). If the amount of crossline energy is a third amount higher than the expected amount of crossline energy, then 3D data processing is performed (at 510).

Note that normally, 2D measurement data would be processed using a 2D processing technique. However, the process of FIG. 5 allows for selection of a different processing technique depending on the determined amount of crossline energy. For example, if the crossline energy is too high in the 2D measurement data, then that would indicate that using 2D data processing may not produce accurate results.

Figure 6:
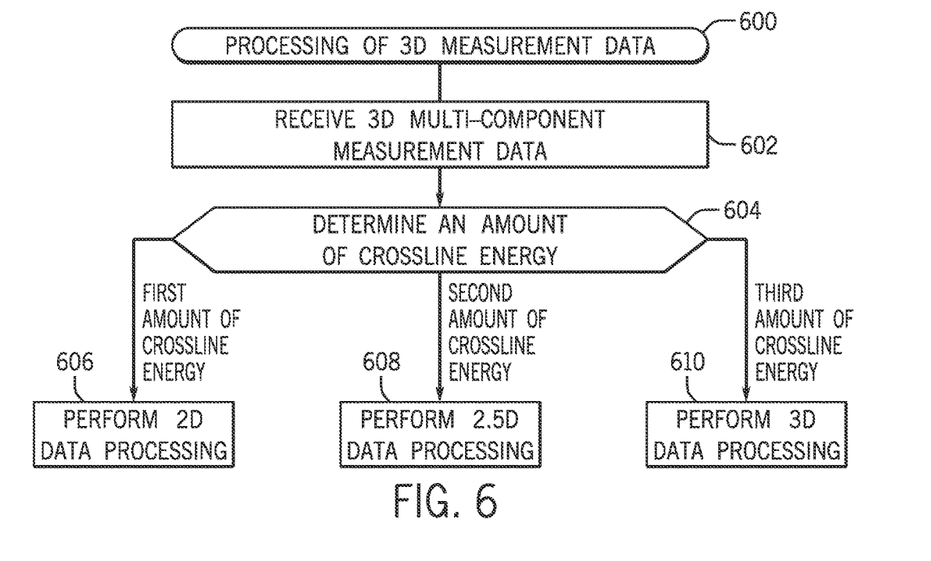

FIG. 6 is a flow diagram of a process 600 for processing of 3D measurement data according to some embodiments. The process 600 receives (at 602) 3D multi-component measurement. The amount of crossline energy is determined (at 604). One of multiple different types of processing techniques (2D, 2.5D or 3D data processing technique) is selected based on the determined amount of crossline energy. 2D data processing is performed (at 606) if the crossline energy is a first amount. 2.5D data processing is performed (at 608) if the crossline energy is a second amount. 3D data processing is performed (at 610) if the crossline energy is a third amount.

3D measurement data would normally be processed by a 3D data processing technique. However, the FIG. 6 flow allows for selection of a different processing technique based on the amount of crossline energy. By selecting a 2D or 2.5D data processing technique when the crossline energy is relatively low, then a more computationally efficient processing technique can be applied on the 3D measurement data.

Figure 7:
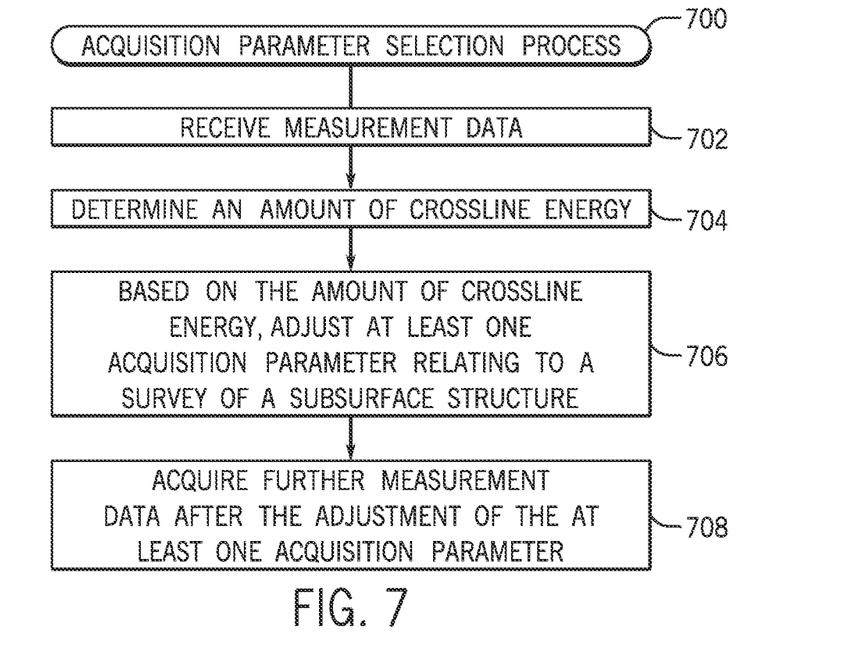
FIG. 7 is a flow diagram of a process of adjusting at least one acquisition parameter, according to further implementations.

FIG. 7 is a flow diagram of a process 700 relating to selecting at least one acquisition parameter relating to performing a survey data acquisition operation in accordance with some embodiments. The process 700 receives (at 702) multi-component measurement data. The amount of crossline energy is determined (at 704). Based on the amount of crossline energy, at least one acquisition parameter relating to a survey of the subsurface structure is adjusted (at 706). After the adjustment of the at least one acquisition parameter, further measurement data is acquired (at 708). The adjustment of the at least one acquisition parameter can be performed in real-time, in other words, the adjustment can be performed as the survey data acquisition operation is ongoing.

In the water layer the polarization direction of the seismic waves is parallel to the wave propagation direction. The polarization vector of the direct arrival is parallel to the source to receiver propagation direction, and the horizontal components of the polarization vector are directly related to the source receiver azimuth. The same property can be observed on waves propagating in a medium with horizontal/simple geology (which assumes a flat earth model), especially on shallow reflection events with a larger incidence angle. The source and receiver geometry partly explains the presence of energy on the cross-line component. However, the acquisition geometry cannot explain all energy recorded on the cross-line component measurements, for example: out of the plane reflection/diffraction data from complex geology or noise propagating cross-line in the streamer (e.g. seismic interference). Depending on their strength, consistency, the acquisition environment and knowledge of the geology, such events can have a significant impact on the processing.

Figure 8:
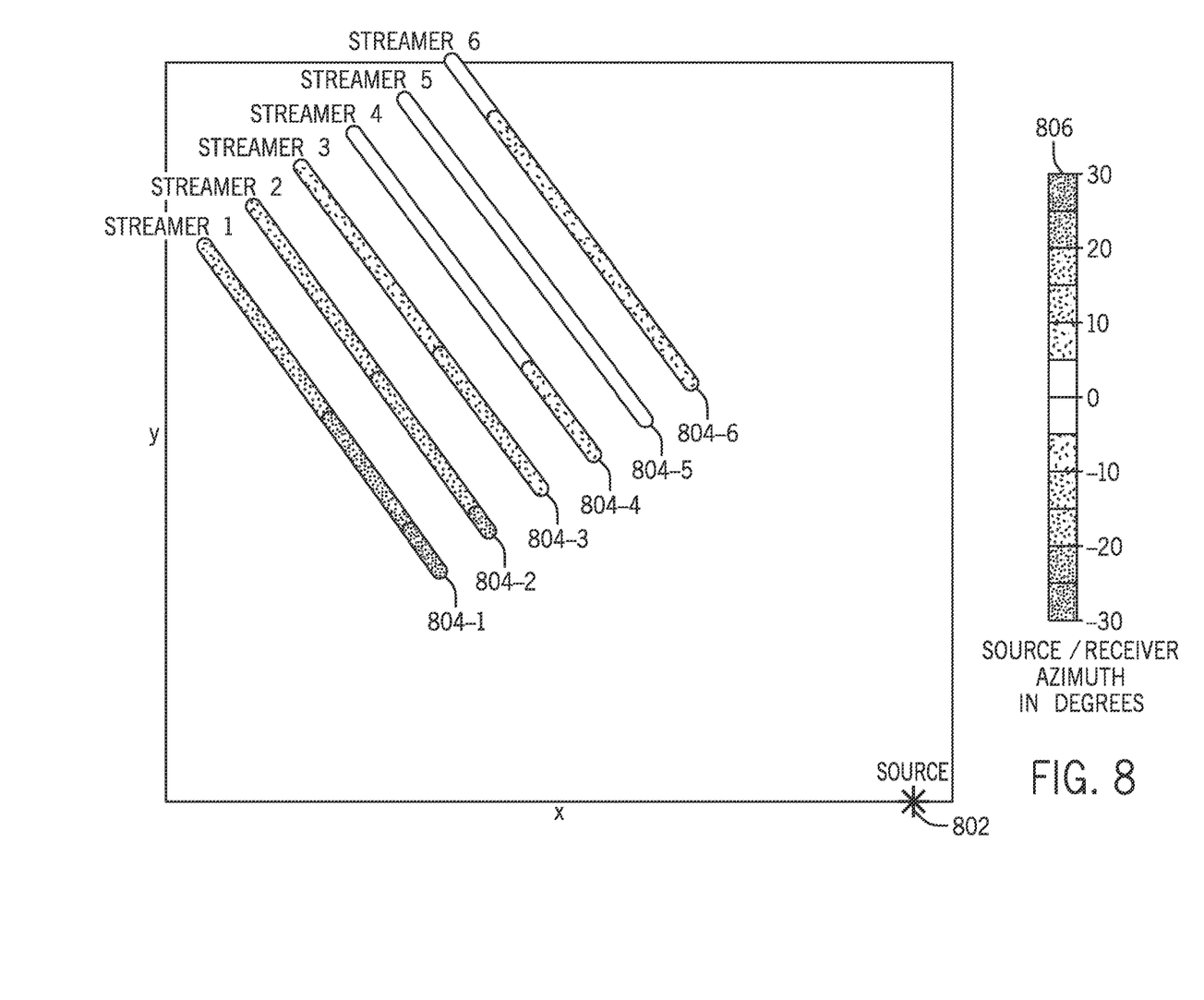
FIG. 8 is a schematic top view of a survey source and multiple streamers, for acquiring measurement data subject to processing according to some implementations.

The following provides a further explanation regarding a technique for determining crossline energy using polarization analysis (item 9 above). Although a discussion is provided of this example, it is noted that any other technique, such as any of those provided above or other techniques, can be used for determining crossline energy. An acquisition geometry can be used to define a threshold between the expected and unexpected amount of energy recorded by the cross-line component. FIG. 8 represents a map view (in the x and y dimensions) of an acquisition spread that has one survey source 802 and multiple streamers 804-1 to 804-6 (six streamers are shown in the example of FIG. 8). A pattern scale 806 depicts patterns corresponding to a respective source-to-receiver azimuth for each survey receiver on each streamer. The source-to-receiver azimuth is referenced from an average inline direction. The source-to-receiver azimuth refers to an angle between a portion of a streamer and the average inline direction of the streamers 804-1 to 804-6. In the example of FIG. 8, the streamer 804-5 is mostly in-line with the source, and has survey receivers that have relatively low variation in source-to-receiver azimuth. Other streamers have larger variations in source-to-receiver azimuth. For example, in streamer 804-1, a near offset survey receiver (a survey receiver closer to the survey source 802) has a larger source-to-receiver azimuth than a larger offset survey receiver.

This azimuth variation with respect to receivers and streamers is expected to be reflected in horizontal (x and y direction) measurements, and especially the crossline measurements. The azimuth variations due to the geometry of the survey spread, such as that depicted in FIG. 8, are referred to geometry-driven azimuth variations.

Azimuths can also be estimated from horizontal measurements (which are referred to as data-driven azimuths), such as based on ratios of inline and crossline RMS amplitudes, associated with the technique in item 7 referenced above. If the geometry-driven azimuth values match reasonably well (in amplitude and trend) to the data-driven azimuth values estimated from horizontal measurements, then that can justify using 2.5D processing if desired. However, if the geometry-driven azimuth values do not match the data-driven azimuth values (e.g. the data-driven azimuth values are much higher and do not exhibit any variation from streamer to streamer), then that can be an indication of the presence of crossline energy that is substantially polarized in the crossline direction that is not explained by acquisition geometry. In this case, 3D data processing should be applied.

In some implementations, the differences between the geometry-driven azimuth values and the data-driven azimuth values can be calculated. These absolute differences can be used by a computer system to automatically determine the amount of crossline energy unrelated to acquisition geometry.

Figure 9:
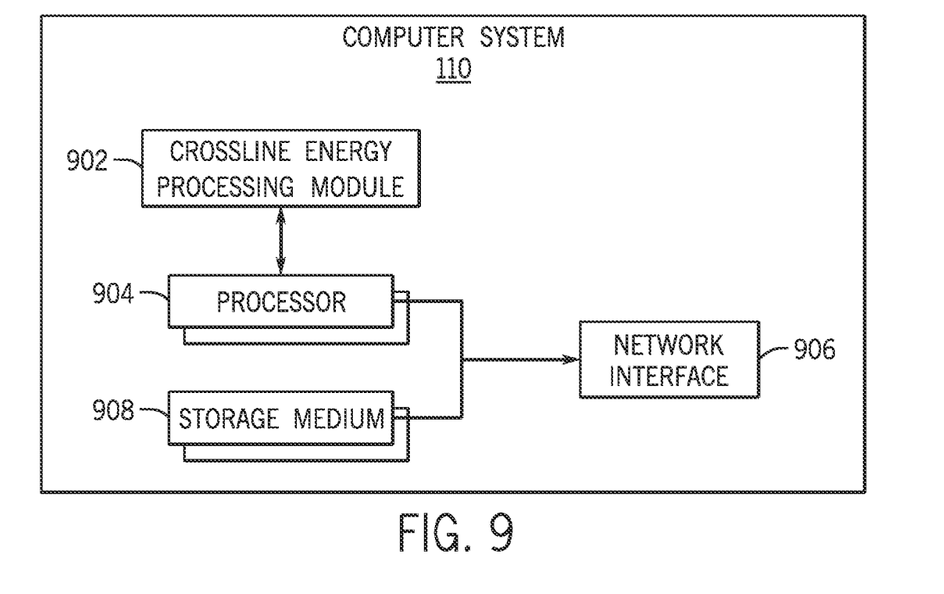
FIG. 9 is a block diagram of a computer system according to some implementations.

FIG. 9 is a block diagram of an example computer system 110 according to some implementations. The computer system includes a crossline energy processing module 902, which can perform various tasks discussed above, such as tasks depicted in FIGS. 3 and 5-7 as well as other tasks described above. The crossline energy processing module 902 can be implemented as machine-readable instructions that can be loaded for execution on a processor or processors 904. A processor can include a microprocessor, microcontroller, processor module or subsystem, programmable integrated circuit, programmable gate array, or another control or computing device.

The processor(s) 904 can be connected to a network interface 906, which allows the computer system 110 to communicate over a network, such as to download data acquired by survey receivers. The processor(s) 904 can also be connected to a computer-readable or machine-readable storage medium (or storage media) 908, to store data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a system comprising a processor, crossline measurement data measured by at least one survey receiver;
based at least in part on an amount of crossline energy of the crossline measurement data, selecting, by the system, an option from among a plurality of candidate options, wherein selecting the option includes adjusting at least one parameter associated with performing a survey of a target structure; and
performing the survey with survey equipment operated according to the adjusted at least one parameter.

2. The method of claim 1, wherein the adjusted at least one parameter includes a spacing between survey lines including survey receivers.

3. The method of claim 1, wherein adjusting the at least one parameter includes performing a real-time adjustment of the at least one parameter during performance of the survey of the target structure.

4. The method of claim 1, wherein the selecting is based at least in part on comparing the amount of the crossline energy to a predicted amount of crossline energy.

5. The method of claim 1, wherein receiving the crossline measurement data comprises receiving the crossline measurement data measured by the at least one survey receiver in a towed marine streamer.

6. A computer system, comprising:
at least one processor to:
- receive crossline measurement data measured by at least one survey receiver;
- based at least in part on an amount of crossline energy of the crossline measurement data, select an option from among a plurality of candidate options, wherein selecting the option includes adjusting at least one parameter associated with performing a survey of a target structure; and
- control survey equipment according to the adjusted at least one parameter to perform the survey.

7. The computer system of claim 6, wherein the at least one processor is to determine the amount of crossline energy using pre-stack data.

8. The computer system of claim 6, wherein the at least one processor is to determine the amount of crossline energy using post-stack data.

9. The computer system of claim 6, wherein the adjusted at least one parameter includes a spacing between survey lines including survey receivers.

10. The computer system of claim 6, wherein adjusting the at least one parameter includes performing a real-time adjustment of the at least one parameter during performance of the survey of the target structure.

11. An article comprising at least one non-transitory machine-readable storage medium storing instructions that upon execution cause a computer system to:
- receive crossline measurement data measured by at least one survey receiver;
- based at least in part on an amount of crossline energy of the crossline measurement data, select an option from among a plurality of candidate options, wherein selecting the option includes adjusting at least one parameter associated with performing a survey of a target structure; and
- control survey equipment according to the adjusted at least one parameter to perform the survey.

12. The article of claim 11, wherein the amount of crossline energy is determined based on one or more selected from the group consisting of: analysis of amplitudes of measurement data; analysis of root-mean-square amplitudes of measurement data; analysis of at least one power spectrum of measurement data; analysis of at least one spectrogram of measurement data; analysis of short time average and long time average values of measurement data; cross-correlation between inline and crossline measurement data; analysis of a ratio between amplitudes of inline and crossline measurement data; analysis of a ratio between spectra or spectrograms of inline and crossline measurement data; polarization analysis; and time gradient ratio analysis.

13. The article of claim 11, wherein the adjusted at least one parameter includes a spacing between survey lines including survey receivers.

14. The article of claim 11, wherein adjusting the at least one parameter includes performing a real-time adjustment of the at least one parameter during performance of the survey of the target structure.

* * * * *